US009194250B1

(12) United States Patent
Tralshawala et al.

(10) Patent No.: US 9,194,250 B1
(45) Date of Patent: Nov. 24, 2015

(54) EMBEDDED WIRELESS SENSORS FOR TURBOMACHINE COMPONENT DEFECT MONITORING

(71) Applicant: General Electric Company, Schenectady, NY (US)

(72) Inventors: Nilesh Tralshawala, Rexford, NY (US); Daniel White Sexton, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/271,622

(22) Filed: May 7, 2014

(51) Int. Cl.
*F01D 21/00* (2006.01)
*H04B 7/24* (2006.01)

(52) U.S. Cl.
CPC ............... *F01D 21/003* (2013.01); *H04B 7/24* (2013.01)

(58) Field of Classification Search
None
See application file for complete search history.

(56) References Cited

U.S. PATENT DOCUMENTS

| | | | | |
|---|---|---|---|---|
| 5,005,015 | A * | 4/1991 | Dehn et al. | 340/962 |
| 5,005,353 | A * | 4/1991 | Acton et al. | 60/39.281 |
| 5,230,603 | A * | 7/1993 | Day | 415/26 |
| 6,512,379 | B2 * | 1/2003 | Harrold et al. | 324/632 |
| 6,838,157 | B2 | 1/2005 | Subramanian | |
| 7,004,622 | B2 | 2/2006 | Hardwicke et al. | |
| 7,072,784 | B2 * | 7/2006 | Wobben | 702/76 |
| 7,270,890 | B2 | 9/2007 | Sabol et al. | |
| 7,351,290 | B2 | 4/2008 | Rutkowski et al. | |
| 7,360,437 | B2 * | 4/2008 | Hardwicke et al. | 73/763 |
| 7,368,827 | B2 | 5/2008 | Kulkarni et al. | |
| 7,572,524 | B2 | 8/2009 | Sabol et al. | |
| 7,582,359 | B2 | 9/2009 | Sabol et al. | |
| 7,618,712 | B2 | 11/2009 | Sabol et al. | |
| 7,969,323 | B2 | 6/2011 | Mitchell et al. | |
| 8,004,423 | B2 | 8/2011 | Mitchell et al. | |
| 8,076,587 | B2 * | 12/2011 | Mitchell et al. | 174/257 |
| 8,151,623 | B2 | 4/2012 | Shinde et al. | |
| 8,231,344 | B2 * | 7/2012 | Kinzie et al. | 416/1 |
| 8,348,504 | B2 * | 1/2013 | Gregory et al. | 374/152 |
| 8,444,377 | B2 | 5/2013 | Kottilingam et al. | |
| 8,511,177 | B1 * | 8/2013 | Makaremi | 73/847 |
| 8,519,866 | B2 * | 8/2013 | Mitchell et al. | 340/870.01 |
| 8,558,705 | B2 * | 10/2013 | Gong et al. | 340/584 |
| 8,577,504 | B1 * | 11/2013 | Morrison et al. | 700/275 |
| 8,718,831 | B2 * | 5/2014 | Wang et al. | 700/287 |
| 8,742,944 | B2 * | 6/2014 | Mitchell et al. | 340/870.01 |
| 8,797,179 | B2 * | 8/2014 | Subramanian et al. | 340/870.07 |
| 8,803,703 | B2 * | 8/2014 | Mitchell et al. | 340/870.07 |
| 8,952,674 | B2 * | 2/2015 | Mitchell et al. | 323/314 |

(Continued)

OTHER PUBLICATIONS

U.S. Appl. No. 13/585,194, filed Aug. 14, 2012.

*Primary Examiner* — Brian Miller
(74) *Attorney, Agent, or Firm* — Ernest G. Cusick; Hoffman Warnick LLC.

(57) ABSTRACT

Various embodiments include detection systems adapted to monitor at least one physical property of a component in a turbomachine. In some embodiments a detection system includes at least one sensor configured to be affixed to a component of a turbomachine, the at least one sensor for sensing information regarding at least one physical property of the turbomachine component during operation of the turbomachine, a signal converter communicatively coupled to the at least one sensor and at least one RF communication device configured to be affixed to a stationary component of the turbomachine, the radio frequency communication device configured to communicate with the at least one signal converter via an RF antenna coupled to the signal converter.

19 Claims, 6 Drawing Sheets

(56) References Cited

U.S. PATENT DOCUMENTS

| | | |
|---|---|---|
| 2004/0114666 A1 | 6/2004 | Hardwicke et al. |
| 2005/0198967 A1 | 9/2005 | Subramanian |
| 2008/0003353 A1* | 1/2008 | Hardwicke et al. ............ 427/122 |
| 2009/0121896 A1* | 5/2009 | Mitchell et al. ........... 340/870.31 |
| 2010/0095740 A1* | 4/2010 | Walton et al. ................... 73/23.2 |
| 2013/0259682 A1* | 10/2013 | Kammer ............................ 416/1 |

* cited by examiner

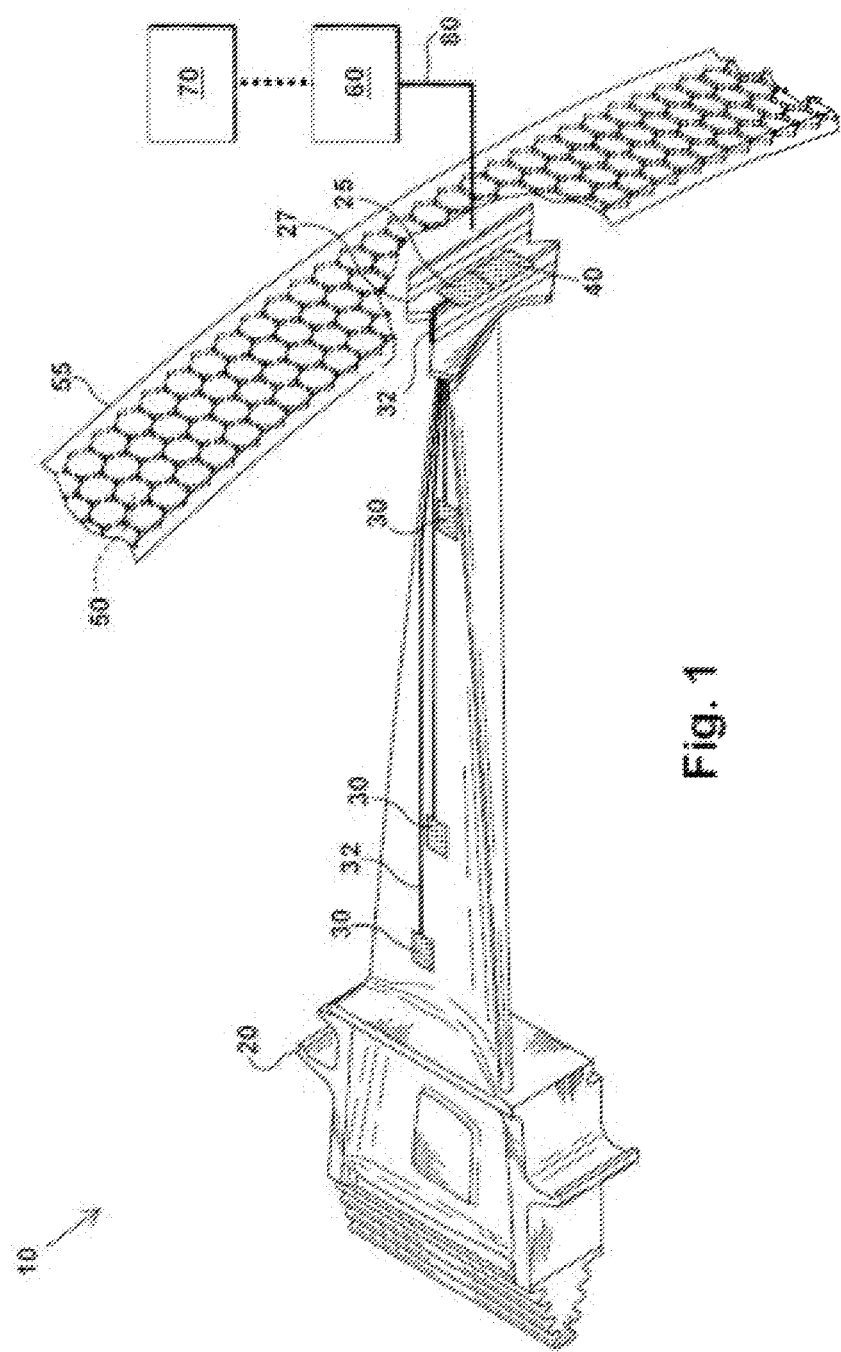

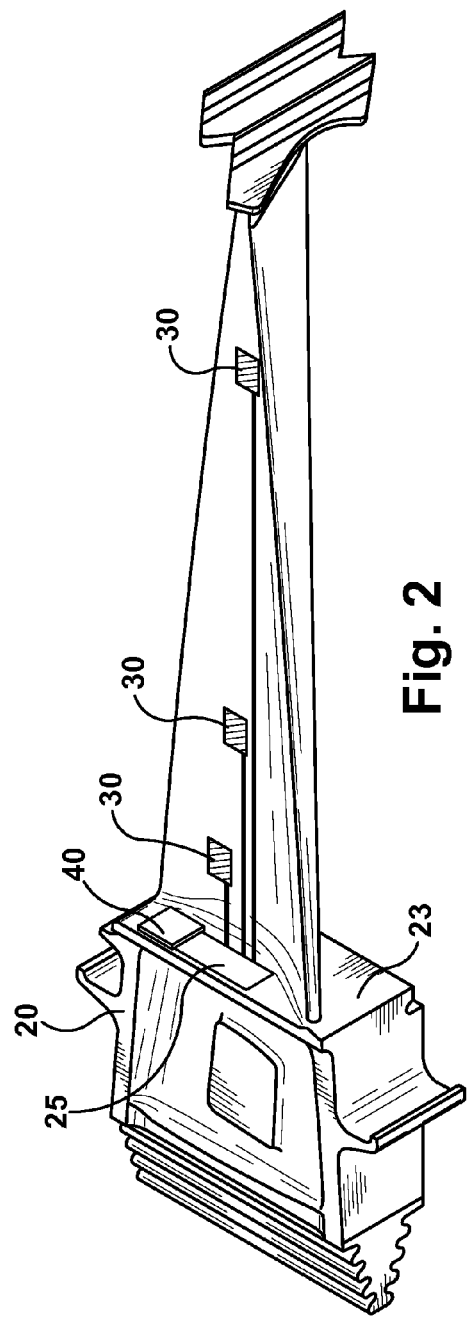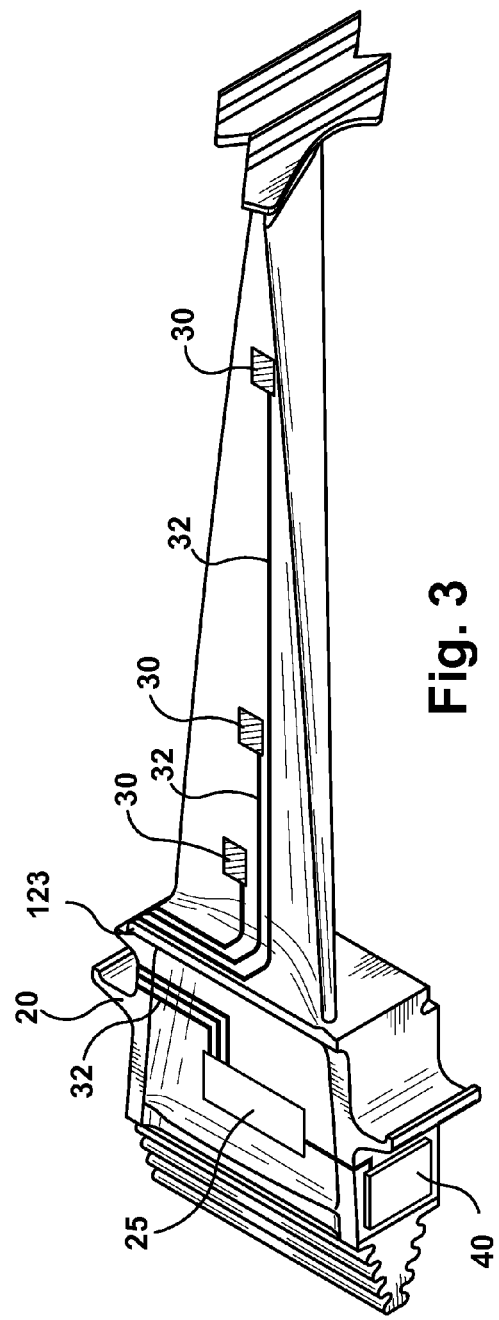

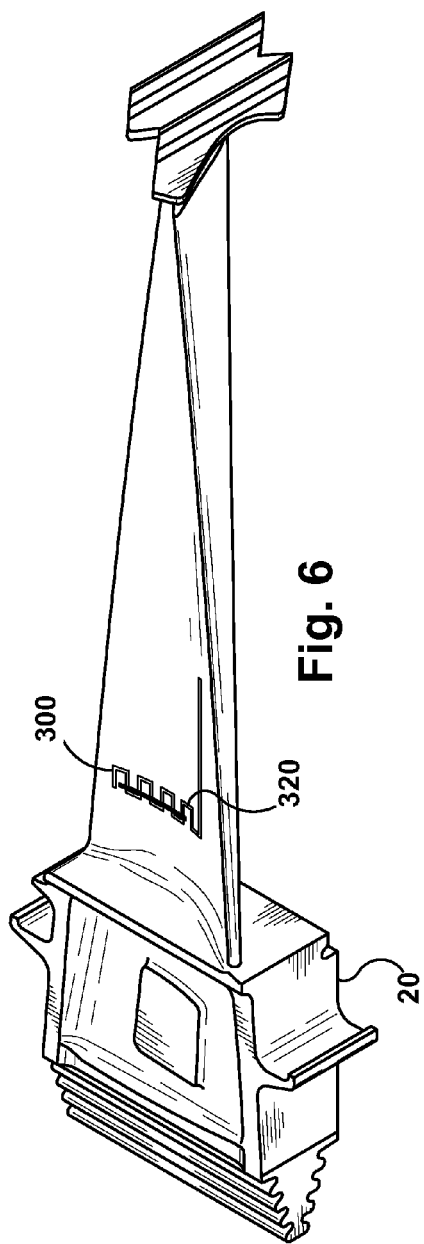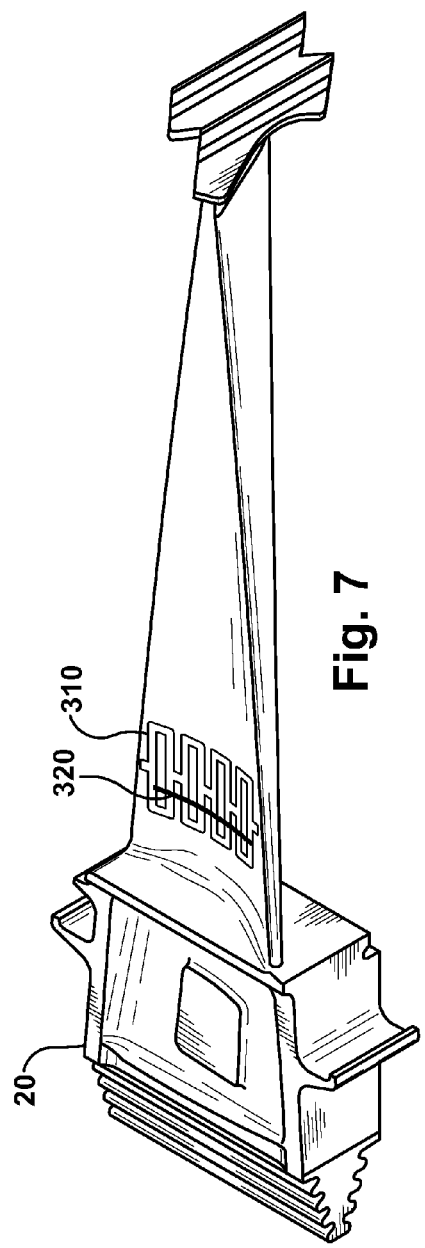

EMBEDDED WIRELESS SENSORS FOR TURBOMACHINE COMPONENT DEFECT MONITORING

GOVERNMENT LICENSE RIGHTS

This invention was made with Government support under contract number DE-FC26-05NT42643, awarded by the Department of Energy. The Government of the United States of America has certain rights in the invention.

FIELD OF THE INVENTION

The subject matter disclosed herein relates generally to turbomachines. More specifically, the disclosure provided herein relates to detection of material defects in turbomachine components.

BACKGROUND OF THE INVENTION

Turbomachine components, including gas turbine (GT) components experience harsh environments when in use. Such environments may cause variations in material properties of turbomachine components (e.g., buckets, nozzles, vanes or blades) which are often difficult to detect. Once such components are placed in-service, small differences in the components themselves, caused by variations in material properties, may begin to create wide variation in useful life of the components. Generally, remaining useful life (RUL) prediction models are used in order to perform scheduled replacement of turbomachine components. As a consequence, many turbomachine components are replaced long before the ends of their actual useful lives. Replacement of components based on scheduled maintenance programs is expensive, however potentially unnecessary, routine replacement may be preferential to the possibility of catastrophic failure of a turbomachine.

BRIEF DESCRIPTION OF THE INVENTION

Various embodiments include detection systems adapted to monitor at least one physical property of a component in a turbomachine. In some embodiments a detection system includes at least one sensor configured to be affixed to a component of a turbomachine, the at least one sensor for sensing information regarding at least one physical property of the turbomachine component during operation of the turbomachine, a signal converter communicatively coupled to the at least one sensor and at least one RF communication device configured to be affixed to a stationary component of the turbomachine, the radio frequency communication device configured to communicate with the at least one signal converter via an RF antenna coupled to the signal converter.

A first aspect provides a detection system including: at least one sensor configured to be affixed to a component of a turbomachine, the at least one sensor for sensing information regarding at least one physical property of the turbomachine component during operation of the turbomachine; a signal converter communicatively coupled to the at least one sensor; and at least one RF communication device configured to be affixed to a stationary component of the turbomachine, the radio frequency communication device configured to communicate with the at least one signal converter via an RF antenna coupled to the signal converter.

A second aspect provides a turbomachine component comprising: a component body; a detection system coupled to the body of the component, the detection system including: at least one sensor configured to be affixed to the turbomachine component, the at least one sensor for sensing information regarding at least one physical property of the turbomachine component during operation of the turbomachine; a signal converter communicatively coupled to the at least one sensor; and at least one RF communication device configured to be affixed to a stationary component of the turbomachine, the radio frequency communication device configured to communicate with the at least one signal converter via an RF antenna coupled to the signal converter.

A third aspect provides a detection system including: at least one sensor configured to be affixed to a rotating component of a turbomachine, the at least one sensor for sensing information regarding at least one physical property of the turbomachine component during operation of the turbomachine; a signal converter disposed on a platform of a rotating component of the turbomachine communicatively coupled to the at least one sensor; and a transceiver antenna traversing an aperture in a casing of the turbomachine for transmitting and receiving, via electromagnetic resonance, signals from the signal converter.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 1 illustrates a three-dimensional perspective view of a system according to embodiments of the invention.

FIG. 2 illustrates a three-dimensional perspective view of a turbomachine component according to embodiments of the invention.

FIG. 3 illustrates a three-dimensional perspective view of a turbomachine component according to embodiments of the invention.

FIG. 6 illustrates a three-dimensional perspective view of a turbomachine component according to embodiments of the invention.

FIG. 7 illustrates a three-dimensional perspective view of a turbomachine component according to embodiments of the invention.

Figure 4:
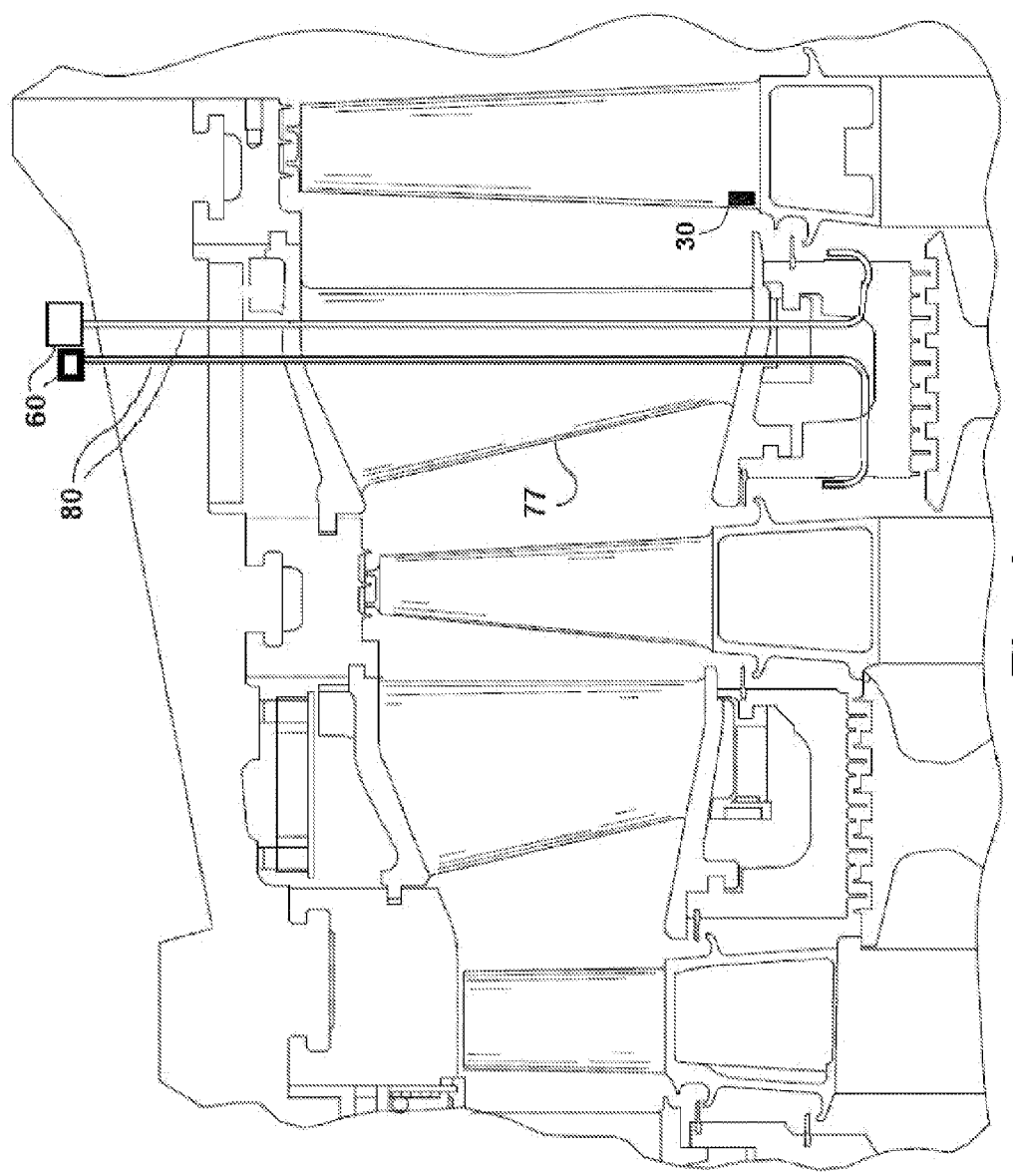
FIG. 4-5 illustrates a three-dimensional perspective view of a system according to embodiments of the invention.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-8, like numbering may represent like elements. Redundant explanation of these elements has been omitted for clarity. Finally, it is understood that the components of FIGS. 1-7 and their accompanying descriptions may be applied to any embodiment described herein.

DETAILED DESCRIPTION OF THE INVENTION

The subject matter disclosed herein relates generally to turbomachine. More specifically, the disclosure provided herein relates to detection of material defects in turbomachine components.

Embodiments of the invention provide for monitoring, detection and measurement of physical properties of turbomachine components, for example, turbomachine buckets, nozzles, blades or vanes. Monitoring may be accomplished using passive, wireless temperature sensors and/or strain sensors. Other sensors that may be used include, but are not limited to: strain sensors, pressure sensors, vibration measurement sensors, surface anomaly sensors, etc. Aspects may include passive modulation of surface acoustic waves (SAW) or other non-linear resonant (NLR) devices. Telemetry used in such devices may use near field readout or resonant cavity modulation in order to lessen radio frequency (RF) transmission issues inside enclosed or partially enclosed compartments of the turbomachine. Real-time monitoring may allow for storage and analysis of component-specific temperature and strain history, which in turn, allow for determination of remaining useful life (RUL) or life management and/or creep management, and therefore allow for on-line condition-based monitoring (OCBM). Creep is conventionally defined as the tendency of a solid material to deform permanently under the influence of heat and mechanical stresses and therefore creep management, as referred to herein, is understood to mean detection and/or monitoring of creep in materials of turbomachine components. As differentiated from conventional monitoring and scheduled maintenance, embodiments described herein help in extending the life of turbomachine components by allowing components to be used beyond needlessly shortened lifetimes calculated using fleet statistical and historic life prediction models. Furthermore, embodiments of the invention allow for detection of conditions which may lead to premature catastrophic failure which may occur prior to scheduled maintenance as determined by the RUL prediction models.

The SAW/NLR used may act as the sensor itself. According to embodiments where the SAW/NLR acts as the sensor, The converter, e.g., the SAW/NLR, could also act as a sensor and antennas may be placed either in the tip or the shank or a rotating component of a turbomachine. Such antennas may be electrically connected to the SAW/NLR sensors, which can be placed anywhere on the buckets or nozzles or blades or stator vanes. A SAW/NLR may be used to sense physical properties such as temperature, strain and/or pressure. For both SAW & NLR, these parameters show up as changes to the resonance frequency and Q-factor of the resonator. Devices according to aspects may be further be designed to only sense only a single physical property and be insensitive to all others. According to aspects which use SAW, sensing may be based on changes in times of arrival of echoes from various reflectors and such changes may be related to the property being sensed.

FIG. 1 illustrates a detection system 10 according to embodiments of the invention. The detection system includes at least one sensor 30 configured to be affixed to turbomachine component 20 of a turbomachine, the at least one sensor 30 may be used for sensing information regarding at least one physical property of the turbomachine bucket during operation of the turbomachine. It should be noted that component 20 is illustrated as a turbomachine bucket, however embodiments of the invention may use a sensor affixed to another rotating turbomachine component such as, but not limited to a blade, or to a stationary component, such as, but not limited to a nozzle or a vane. The at least one sensor 30 may be a strain measurement sensor, a thermocouple, an antenna (e.g., a crack-detection antenna, as described below), etc. Physical properties sensed may include, but are not limited to creep, vibration, temperature, strain, or a crack in the material of the component being sensed. Sensor 30 may be communicatively coupled with a signal converter 25. Such communicative coupling may be by way of a hardwiring, or by a "direct write" method, e.g., by spraying or depositing wiring material. Communication conduit 32 is shown in FIG. 1 as an example of a communicative coupling between sensor 30 and signal converter 25. Such coupling may further be accomplished by physical connections where communication conduit is a wire welded to bucket 20 at appropriate locations. Signal converter 25 may include at least one of a surface acoustic wave (SAW) sensor, a non-linear lumped resonator (NLR) or an RF resonant structure. The SAW or the NLR may include micro-electro-mechanical systems (MEMS) which detect the modulation of surface acoustic waves to sense a physical phenomenon. Such differences in detected phenomena may indicate stress, strain, material defect, or other phenomena. The SAW or the NLR devices may enable the converting of input electrical signals from sensors 30 into an electrical signal which may be communicated to a transceiver or transponder antenna device 80, which is connected to a RF communication device 60. RF communication device 60 may be connected to a computing device for storage and or analysis, such as computing device 70. Changes in amplitude, phase, frequency, or time-delay between the input and output electrical signals can be used to measure the presence of the desired phenomenon, e.g. a defect, stress, strain or creep. FIG. 1 illustrates signal converter 25, which may include a SAW/NLR, located in a blade tip shroud 27 of turbomachine bucket 20. Other locations for a SAW/NLR, i.e. a signal converter 25 are possible, as described below. Signal converter 25 may further be associated with SAW transponder reflectors and may convert signals reflected by such converters.

FIG. 1 further illustrates a one radio frequency (RF) antenna 40 connected to signal converter 25. RF antenna 40 may be used for transmission of information sensed by sensors 30 and for information/instructions to be sent to sensors 30. Examples of instructions may include instructions to begin to sense, to stop sensing, or to change the type of information being sensed, when appropriate. It should be noted that while FIG. 1 illustrates three sensors 30 affixed to component 20, any number of sensors 30 may be used according to embodiments of the invention. Furthermore, while only one bucket is illustrated, a turbomachine may have a plurality of components, such as buckets, with affixed sensors.

FIG. 1 illustrates radio frequency (RF) communication device 60. RF communication device 60 may be configured to be affixed to a stationary component of the turbomachine, e.g., a turbine casing, or a stator (example affixation shown in FIG. 4). RF communication device 60 may be configured, with antenna 80, to communicate with signal converter 25 via antenna 40. RF communication device 60 may be a receiver for receiving information from signal converter 25 via antenna 40, or RF communication device 60 may be a transceiver for sending and receiving information to and from signal converter 25, via antenna 40. Embodiments of the invention may be used in conjunction with key phasor output systems. Such systems keep track of positioning of rotating turbomachine components, such that a key phasor output system would track which one of a plurality of rotating turbomachine components, such as buckets, is passing by a known location within the turbomachine at a given time. Such tracking may be useful during machine operation to determine component health in real time. When RF communication device 60 receives a signal from a signal converter 25, the key phasor output system may be able to determine which component (e.g., a bucket) the specific signal converter 25 is attached to, and therefore which sensor 30 the system may be currently reading from. Next, to find exact location of sensor 30 on that specific bucket, features from converter 25 such as, e.g., time and/or frequency demodulation may be used. The sensor readout feature of the converter 25 (as an example, time and/or frequency demodulation of the SAW or NLR signals) further enables determination of the location of the sensor 30 that originated the sent signal on the component. Therefore a system according to embodiments of the invention may thus be able to determine the location of a material defect in a component. The use of a key phasor system may help lessen data transmission loads and allow for many more sensors 30 that can be read out, compared to a system where each and every sensor is required to send a self-identification signal along with material defect-related information.

FIG. 1 illustrates honeycomb seal in turbine casing 55. According to embodiments, convertor or sensor antenna 40 may be used to send or receive information with transceiver antenna 80, which is placed through honeycomb seal 50 in turbomachine casing 55. For example, in cases where antenna 40 is attached to a rotating component 20, this information transfer will happen every time antenna 40 passes near antenna 80 during the rotation.

FIG. 1 illustrates computing device 70 connected to RF communication device 60 with dashed lines to illustrate the possibility of different communication modes therebetween. E.g., wired or wireless or optical. According to some embodiments, computing device 70 may be configured to receive the information regarding the at least one physical property of turbomachine bucket 20 from at least one sensor 30. Computing device 70 may further be configured to store and/or analyze such information. The stored information may be used for historical analysis and for prediction of future performance of the material whose information is sensed. Furthermore, computing device 70 may be configured to identify the at least one sensor and a location of the at least one sensor 30 relative to the turbomachine 100 and/or to issue a warning based on the analysis of the historical data. The warning may be communicated to the turbomachine controller and on-site monitor system, or directed to a user. The warning may regard any of the information being monitored, e.g., imminent cracking, an actual crack, an over-temperature condition, creep, etc. The warning may be a sound alarm, a visible light or any other appropriate signal. The warning may indicate that maintenance is required or soon to be required, as such, embodiments may be employed in condition monitoring systems, where detection of material condition is desired. The warning may be communicated to turbomachinary controllers such as OSM or Mark X controllers, or other now-known or later-developed controllers.

FIG. 2 illustrates an embodiment where sensors 30 are located on a turbomachine bucket 20 and signal converter 25 and antenna 40 are located on platform 23 of bucket 20. It is understood that the platform 23 is the radially outer surface of the shank 123 of the bucket 20. During operation of the turbomachine, the platform 23 region maintains a cooler temperature than some other regions on bucket 20. Locating signal converter 25 and/or antenna 40 on platform 23 may be done to take advantage of this lower temperature.

FIG. 3 illustrates a perspective drawing illustrating a three-dimensional view of a system according to embodiments including communication conduits 32 routed through shank 123 of turbomachine bucket 20 connecting the at least one sensor 30 with the at least one signal converter 25. In such an embodiment, signal converter 25 may be located on shank 123, and sensor antenna 40 may also be located on shank 123. During operation of the turbomachine, the shank region maintains a cooler temperature than some other regions on bucket 20.

FIG. 4 illustrates an embodiment according to aspects of the invention where RF communication antennae 80 for an RF communication device 60 are mounted on the outside surface of the turbomachine nozzle 77. According to embodiments, antennae 80 may be connected to RF communication device 60 through the inside of nozzle 77. This embodiment shows near-field communication of antenna 80 with shank mounted antenna (40 as shown in FIG. 3). This embodiment is shown in FIG. 3 from the sensor and converter perspective.

Figure 5:
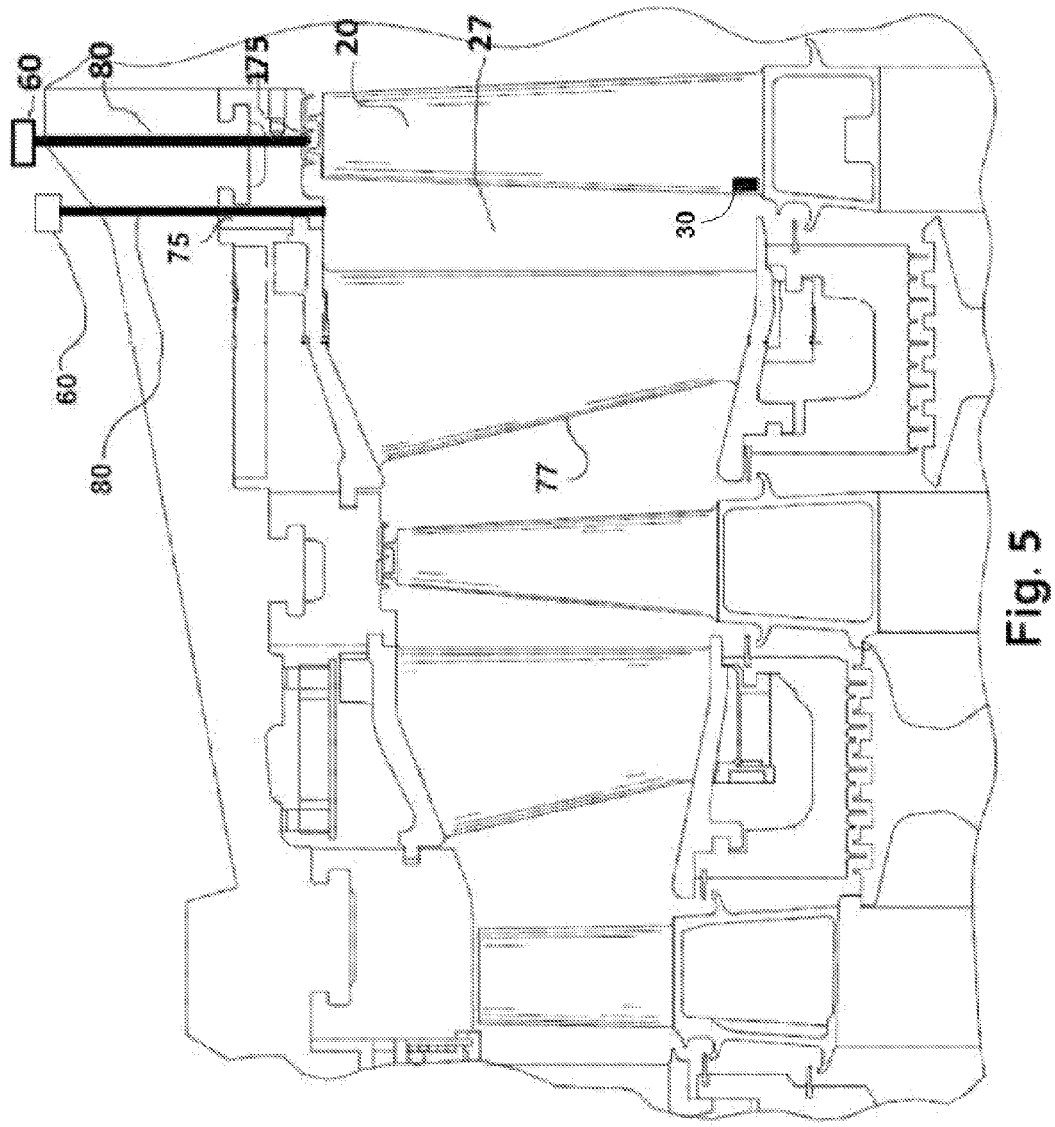

FIG. 5, with continuing reference to FIG. 1, illustrates one embodiment, in the near-field perspective. RF communication device 60 may be a receiver or a transceiver, for receiving data or for transmitting and receiving data, respectively. RF communication device antenna 80 may be mounted in, or flush with, an aperture 175 of a turbomachine 100 in order to communicate via RE link with antenna 40. Aperture 75 may include, e.g., a horoscope hole, a clearance probe hole or any other opening allowing an antenna to access RF signals from the tip of component 20 through a turbomachine casing. As illustrated in FIGS. 1 and 4, transceiver antenna 80 may traverse an aperture 175 in a casing 55 of turbomachine 100 for transmitting and receiving near field RF signals from signal converter 25.

FIG. 5 also illustrates another embodiment that may be used with resonant frequency amplification approaches. This embodiment is shown in FIG. 2 from the sensor and converter perspective and works on the principle of electromagnetic resonance in the space 27 between the rotating component 20 (e.g. bucket) and stator component 77 (e.g. nozzle). RF communication device antenna 80 may be mounted in, or flush with, an aperture 75 of a turbomachine in order to communicate via RF link with antenna 40. Aperture 75 may, e.g., be a horoscope hole, or any other opening allowing an antenna to access RF signals from space 27 in the interior of a turbomachine through a turbomachine casing. The RF link being located within inter-nozzle/bucket space. According to embodiments, all modes or RF transmission may be damped or absorbed by the metal of the turbomachine, acting akin to a Faraday cage, however resonant frequencies are amplified. Physical changes to the components such as changes in temperature, stress, cracking and/or strain should modulate the strength of resonant frequency signal(s), and such changes may be detected by systems according to embodiments of the invention. At the resonance frequency, there is a strong communication established between antennas 40 and 80 and any changes in sensors 30 can be measured by demodulation of the resonance frequency signals.

FIGS. 6 and 7 illustrate embodiments having crack-detection antennas 300, 310 as sensors. Crack-detection antennas 300, 310 may be located at one or more locations on turbomachine components, such as buckets 20, where cracks 320 are likely to occur. Such locations may be high-stress locations. When located at a location that experiences cracking, crack-detection antennas 300, 310 may experience a change in impedance due to changed functional length. This change in impedance may be detected and interpreted as a change in a physical property of turbomachine bucket 20 to which it is attached, or more specifically, the change in impedance may be interpreted as a crack in turbomachine bucket 20. Crack-detection sensors 300, 310 may also be used to detect temperature, and/or strain, such crack detection sensors 300, 310 may include one or more antennas. According to embodiments, crack-detection sensors 300, 310 may be RF antennas configured to communicate with RF communication antenna 80 (shown in FIG. 4). Also according to embodiments, crack-detection sensors 300, 310 may be feed sensors, connected to signal converter 25 as shown in FIGS. 1, 2, and 3.

Figure 8:
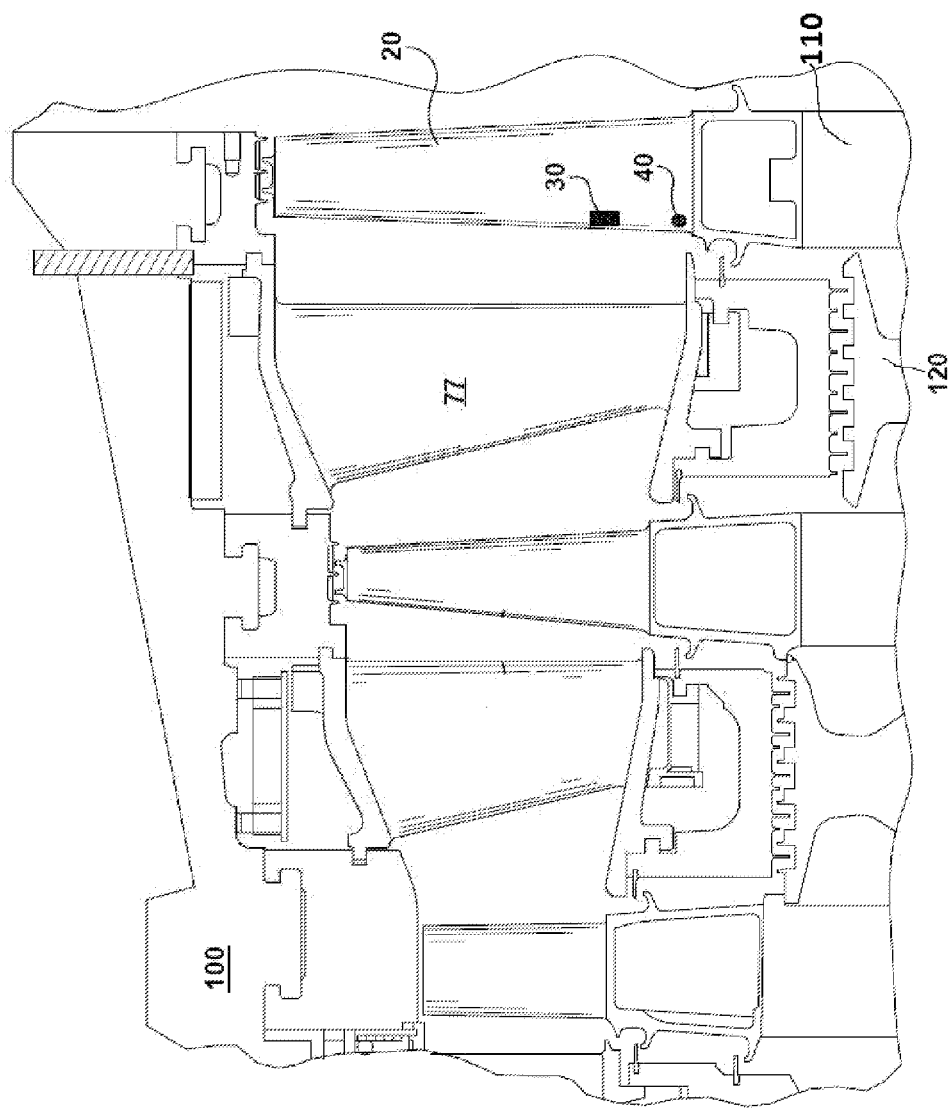
FIG. 8 illustrates a three-dimensional perspective view of a turbomachine according to embodiments of the invention.

FIG. 8, with continuing reference to FIGS. 1-7, illustrates an embodiment where a turbomachine 100 includes a rotor 110 having a shaft 120 inside and a plurality of turbomachine buckets 20 coupled to rotor 110. A detection system is illustrated coupled to at least one of the buckets 20, the detection system including, sensor(s) 30, RF antenna 40 and RF communication antenna 80, signal converter 25 (signal converter 25 shown in FIG. 1). A description of the detection system components is described above with respect to FIG. 1 and will not be repeated for the sake of brevity.

FIG. 8 further illustrates a nozzle 77 and rotor 110 at least partially located inboard of a stator. Rotor 110 is illustrated including a plurality of buckets 20. While not illustrated in FIG. 8, turbomachine 100 may be adapted to include any of the configurations of the detection systems described herein.

As stated above, condition monitoring or health monitoring systems may include at least one computing device 70. Computing device 70 may include program code for executing one or more functions described herein according to various embodiments of the invention. Examples of such functions include, but are not limited to: receiving information regarding at least one physical property of a turbomachine component, such as bucket 20, storing and analyzing such information, prediction of future material performance, etc. It should be understood that OCBM systems may be implemented by one or more general-purpose computers, or on one or more specific-purpose computers, or any combination of such computing devices. Condition monitoring or health monitoring systems according to embodiments of the invention may be in communication with sensor 30 in order to monitor at least one physical property of turbomachine components, and it should be understood that there are many ways of coupling these systems with sensors 30 and/or other components described herein, e.g. wired and/or wirelessly. The at least one computing device 70 may include a processor, memory, input/output, etc., that are physically housed within a turbomachine, outside the turbomachine or at one or more locations.

In any case, the technical effect of the various embodiments of the invention, including, e.g., the condition and/or health monitoring systems, is to monitor at least one physical property of a turbomachine component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A detection system including:
   a turbomachine component within a turbomachine, the turbomachine having a casing housing a turbomachine nozzle, the casing including a first aperture located between the turbomachine component and the turbomachine nozzle;
   at least one radio frequency (RF) communication device affixed to a stationary component of the turbomachine;
   an RF communication device antenna located in the first aperture and communicatively coupled to the at least one RF communication device;
   at least one sensor affixed to the turbomachine component, the at least one sensor for sensing information regarding at least one physical property of the turbomachine component during operation of the turbomachine;
   a signal converter communicatively coupled to the at least one sensor; and
   a sensor RF antenna communicatively coupled to the signal converter,
   wherein the first aperture is configured to allow an RF link between the sensor RF antenna and the RF communication device antenna.

2. The detection system of claim 1, wherein the signal converter is one of a surface acoustic wave sensor (SAW), a non-linear lumped resonator (NLR), or an RF resonant structure.

3. The detection system of claim 1, further comprising;
   a computing device configured to receive the information regarding the at least one physical property of the turbomachine component from the RF communication device.

4. The detection system of claim 3, wherein the computing device is configured to identify the at least one sensor and a location of the at least one sensor relative to the turbomachine.

5. The detection system of claim 1, wherein the at least one RF communication device includes one of a transceiver, or a receiver.

6. The detection system of claim 5, wherein the signal converter is located in a blade tip shroud of the turbomachine component.

7. The detection system of claim 1, wherein the at least one sensor includes one of a strain sensor, a temperature sensor, a pressure sensor, a vibration measurement sensor, a surface anomaly sensor or a crack detection sensor.

8. The detection system of claim 1, further comprising a transceiver antenna traversing a second aperture in the casing of the turbomachine for transmitting and receiving near field RF signals from the signal converter.

9. The detection system of claim 8, further comprising:
   a communication conduit routed through a shank of the turbomachine component connecting the at least one sensor with the signal converter, wherein the signal converter is located on the shank of the turbomachine component.

10. A turbomachine comprising:
    a casing having a first aperture extending therethrough;
    a turbomachine component, a stationary component, and a turbomachine nozzle within the casing,
    wherein the first aperture is located axially between the turbomachine component and the turbomachine nozzle;
    at least one RF communication device affixed to the stationary component of the turbomachine;

an RF communication device antenna located in the first aperture and communicatively coupled to the at least one RF communication device;

at least one sensor affixed to the turbomachine component, the at least one sensor for sensing information regarding at least one physical property of the turbomachine component during operation of the turbomachine;

a signal converter communicatively coupled to the at least one sensor; and a sensor RF antenna communicatively coupled to the signal converter, wherein the first aperture is configured to allow an RF link between the sensor RF antenna and the RF communication device antenna.

11. The turbomachine of claim 10, wherein the turbomachine component includes one of a turbomachine bucket, a turbomachine blade or a turbomachine vane.

12. The turbomachine of claim 10, further comprising:
a computing device configured to receive the information regarding the at least one physical property of the turbomachine component from the RF communication device.

13. The turbomachine of claim 10, wherein the at least one RF communication device includes one of a transceiver, or a receiver.

14. The turbomachine of claim 10, wherein the at least one sensor includes one of a strain sensor, a temperature sensor, a pressure sensor, a vibration measurement sensor, or a crack detection sensor.

15. The turbomachine of claim 10, wherein the signal converter includes one of a surface acoustic wave sensor (SAW), a non-linear lumped resonator (NLR) or an RF resonant structure.

16. The turbomachine of claim 10, wherein the turbomachine component includes a turbomachine bucket and wherein the signal converter is located on one of a blade tip or a shroud of the turbomachine bucket.

17. The turbomachine of claim 16, further comprising:
a communication conduit routed through a shank of the turbomachine bucket connecting the at least one sensor with the signal converter, wherein the signal converter is located on the shank of the turbomachine bucket.

18. A system including:
a turbomachine having:
a casing including an aperture;
a turbomachine component, a turbomachine nozzle and a stationary component within the casing, the turbomachine component including a platform,
wherein the aperture is located axially between the turbomachine component and the turbomachine nozzle;
at least one RF communication device affixed to the stationary component;
an RF communication device antenna located in the first aperture and communicatively coupled to the at least one RF communication device;
at least one sensor affixed to the turbomachine component, the at least one sensor for sensing information regarding at least one physical property of the turbomachine component during operation of the turbomachine;
a signal converter disposed on the platform of the turbomachine component communicatively coupled to the at least one sensor, and
a sensor RF antenna communicatively coupled to the signal converter,
wherein the RF communication device antenna transmits and receives, via electromagnetic resonance, signals from the sensor RF antenna.

19. The system of claim 18, wherein the signal converter is one of a surface acoustic wave sensor (SAW) a non-linear lumped resonator (NLR) or an RF resonant structure.

* * * * *